United States Patent [19]

Klancnik

[11] Patent Number: 4,478,501

[45] Date of Patent: Oct. 23, 1984

[54] SET OF DARK SLIDES FOR USE WITH A ZONE EXPOSURE SYSTEM

[76] Inventor: John H. Klancnik, 14900 W. Imperial Dr., Libertyville, Ill. 60048

[21] Appl. No.: 481,653

[22] Filed: Apr. 4, 1983

[51] Int. Cl.³ .............................................. G03B 17/00
[52] U.S. Cl. ..................... 354/125; 354/354
[58] Field of Search ................. 354/20, 125, 283, 284, 354/285, 354

[56] References Cited

U.S. PATENT DOCUMENTS

| 517,733 | 4/1894 | Cole | 354/125 |
|---|---|---|---|
| 520,034 | 5/1894 | Cole | 354/125 |
| 681,001 | 11/1901 | Miller | 354/125 |
| 910,750 | 1/1909 | Walker | 354/125 |
| 967,569 | 8/1910 | Schaubert | 354/125 |
| 1,056,588 | 3/1913 | Rusk . | |
| 1,226,838 | 5/1917 | Wolber . | |
| 2,380,244 | 7/1945 | Jones et al. | 354/20 |
| 3,122,077 | 2/1964 | Splendore | 354/295 |
| 3,124,050 | 3/1964 | Bay | 354/125 |
| 3,860,943 | 1/1975 | Tague | 354/295 |
| 3,940,775 | 2/1976 | Bodnar | 354/122 |
| 4,079,394 | 3/1978 | Roncone | 354/122 |
| 4,149,790 | 4/1979 | Smith | 354/125 |

FOREIGN PATENT DOCUMENTS 586112  3/1925  France .............................. 354/125

Primary Examiner—A. A. Mathews
Attorney, Agent, or Firm—Kinzer, Plyer, Dorn & McEachran

[57] ABSTRACT

A set of dark slides for a film holder of a camera to adapt the camera to be used with a zone system exposure procedure in which all the exposures are made on a single piece of film. Each dark slide of the set of slides has a single opening. Each opening is formed at a different location on each dark slide so that the openings of all of the dark slides of the set of slides form a pattern of exposures on a piece of film when the piece of film is exposed separately with each dark slide in the holder. The number of dark slides and the pattern of openings in the dark slides are selected to provide a number of separate exposures on the piece of film in the slide holder equal to the number of zones in the zone exposure system being used and a pattern which permits comparison of one exposure with another. At least some of the dark slides of the set have their single openings located on one side of the longitudinal axis of the dark slide so the dark slide can be used to provide exposures at the same relative location on opposite sides of the longitudinal axis of the film by turning over the dark slide in the film holder between one exposure and another.

4 Claims, 12 Drawing Figures

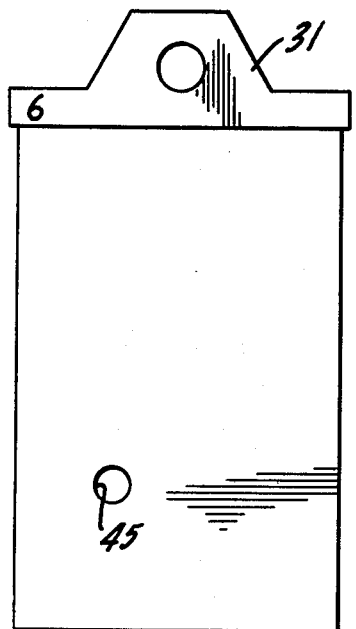
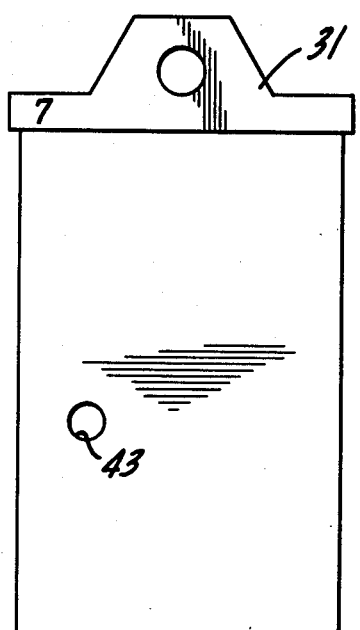
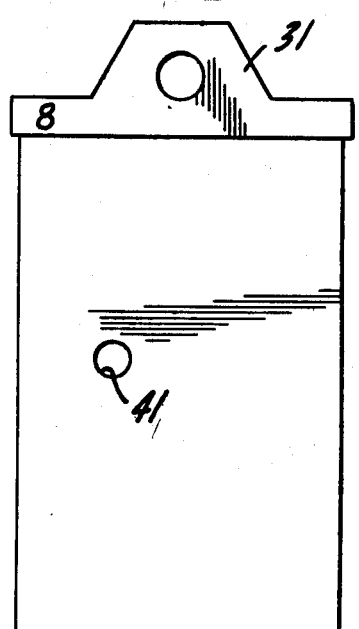
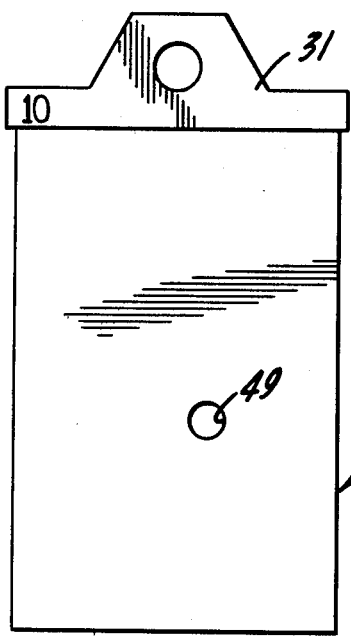
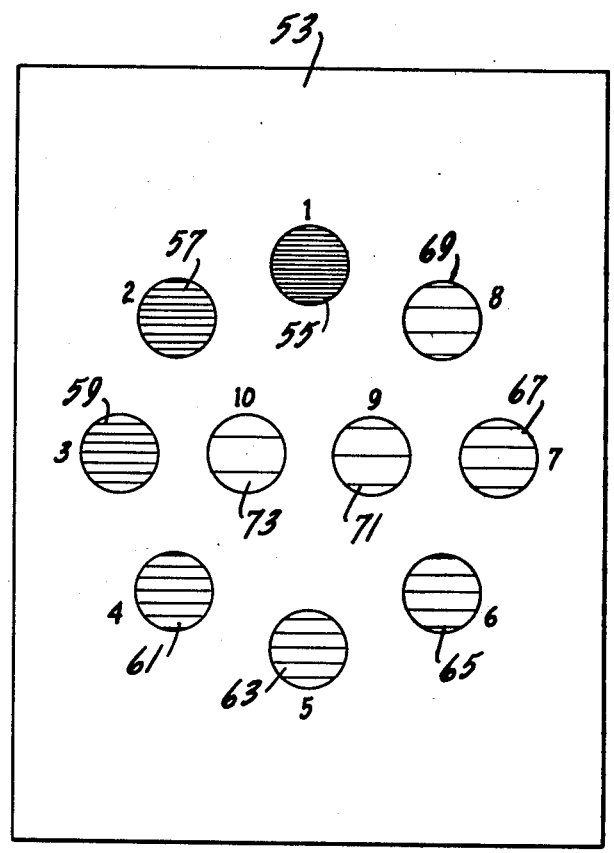

SET OF DARK SLIDES FOR USE WITH A ZONE EXPOSURE SYSTEM

BACKGROUND AND SUMMARY OF THE INVENTION

This invention is concerned with a set of dark slides for a film holder of a camera which permits an entire zone system of exposures to be made on a single negative.

An object of this invention is a series of dark slides for a camera film holder which permits the economical practice of the zone system of exposure control.

Another object of this invention is a set of dark slides for practicing the zone system exposure procedure in which the number of different slides is held to a minimum.

Another object is to simplify the procedure for determining the densities of negatives obtained from a full range of exposures by making all the exposures on a single negative.

Another object is to simplify testing for density changes when using different developers, different agitation methods and different development times.

Another object is a simplified and economical method of testing new lenses, especially wide angle lenses.

Another object is a simplified and economical method of determining the effects obtained by the use of different filters with an appropriate uniform reflecting surface.

The zone system of exposure is used in black and white scenic, architecture studies and artistic photography. The zone system involves the use of an exposure meter which is set for appropriate film speed to read the luminance of a single value subject area. The exposure meter will indicate an exposure that produces a middle-gray rendering. With conventional negative materials, the negative density produced by this exposure will be optimum for printing as a middle-gray on normal contrast paper. Since this relationship between the indicated exposure and the resulting printed value is known and predictable, it is used to define the midpoint of the image value scale. A middle-gray print value that matches the 18% reflectance gray card is designated value 5. The number of zones in the system may vary but zone 5 is the middle reference and starting point. The lower zones are established with each being one f stop interval smaller than the other and the higher zones are each one f stop exposure increases. When these zones are determined, photographs are taken of the single value subject area starting with the zone 1 exposure which is the minimum exposure and working through the zone 9 or 10 exposure which is the maximum. This required as many as ten separate photographs and ten separate sheets of film.

Since the comparison of the final negatives in a zone system requires consistency in development, problems were faced because as many as ten separate negatives had to be developed. Many developers oxidized rapidly and it has been difficult to develop as many as ten negatives under identical conditions. Therefore, an object of my invention is to make all of the exposures of a zone system on a single negative.

Other objects may be found in the following specification, claims and drawings.

BRIEF DESCRIPTION OF THE DRAWINGS

The invention is illustrated more or less diagrammatically in the following drawings wherein:

FIG. 8 is a plan view of the opposite side of the dark slide shown in FIG. 5;

FIG. 9 is a plan view of the opposite side of the dark slide shown in FIG. 4;

FIG. 10 is a plan view of the opposite side of the dark slide shown in FIG. 3;

FIG. 11 is a plan view of the opposite side of the dark slide shown in FIG. 7; and FIG. 12 shows a photographic print of a negative made using the set of dark slides of my invention showing the print densities for each zone of a zone exposure system.

DESCRIPTION OF THE PREFERRED EMBODIMENT

Figure 1:
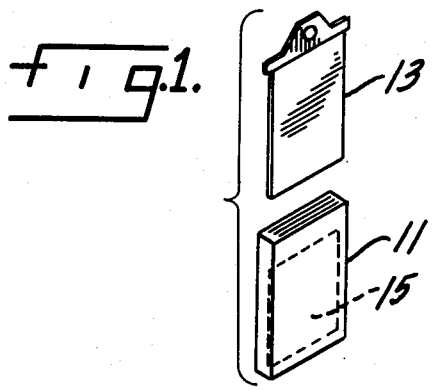
FIG. 1 is a perspective view of a conventional dark slide being inserted in a film holder for a camera.
Figure 2:
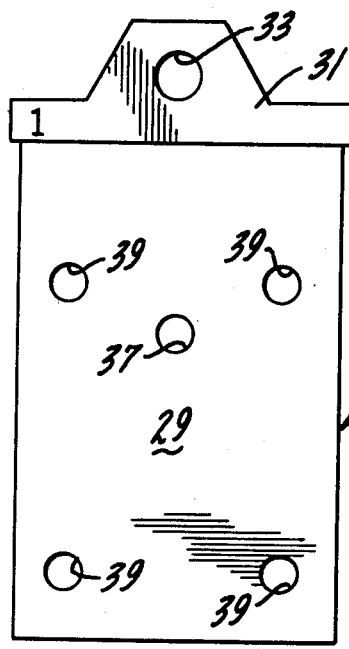
FIGS. 2 through 7 are each a plan view of a different one of the dark slides of the set of dark slides of this invention with the numeral on each dark slide indicating the zone of the zone exposure system which will be photographed with that slide.

FIG. 1 of the drawings shows a film holder 11 with a conventional dark slide 13. The dark slide is removed from the film holder prior to taking a photograph on the film or negative 15. My invention is directed to a set of dark slides which can be used with a typical film holder 11 to practice the zone system of exposures and to create all of the exposures on a single film negative. My invention is adaptable to zone systems with different numbers of zones but for purposes of illustration, it will be shown as applied to a ten zone exposure system.

A set of dark slides for a ten zone exposure system will require six dark slides, 17, 19, 21, 23, 25 and 27 which are shown respectively in FIGS. 2, 3, 4, 5, 6 and 7 of the drawings. Referring to dark slide 17 as a typical slide, it consists of a thin rectangular sheet 29 of black linen phenolic. Attached to one of the ends of the rectangular sheet 29 is a gripping tab 31 with a finger hole 33. The gripping tab may be formed integrally with the phenolic sheet 29 or as is more conventional, it may be a separate piece of somewhat thicker material which is attached to the phenolic sheet.

Dark slide 17 has a zone exposure opening 37 formed therein which opening lies on the center longitudinal axis of the sheet 29. The center of this circular opening also lies on a circle whose center is aligned with the optical axis of the camera lens when the dark slide is positioned in the film holder and the film holder is positioned in the camera to take a photograph. This assumes a normal camera position in which the lens board is parallel to the film holder. The zone exposure opening 37 is used for zone 1 of a zone exposure system and hence the numeral 1 is applied to the gripping tab 31 of the dark slide 17. Although the diameter of the zone exposure opening 37 may be varied, it has been found desirable to form this opening and all other openings in the dark slides of this set of dark slides with diameters of ½ inch.

Also formed in the dark slide 17 are four openings 39 which are used to determine the drop off in illumination in zone 1 using new lenses, especially wide angle lenses. Each of these openings 39 is located equidistant from the optical axis of the camera lens intersection with the dark slide 17. The provision of these openings in the dark slide 17 is optional and they may be omitted if desired.

Figure 3:
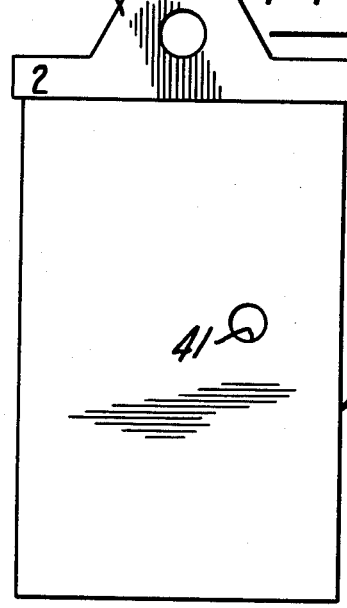

Dark slide 19 shown in FIG. 3 is identical in construction to dark slide 17 except that its zone exposure opening 41 is located off the longitudinal axis of the sheet 29 and is used to determine zone exposure 2. For that reason, a numeral 2 is marked on the gripping tab 31.

Figure 4:
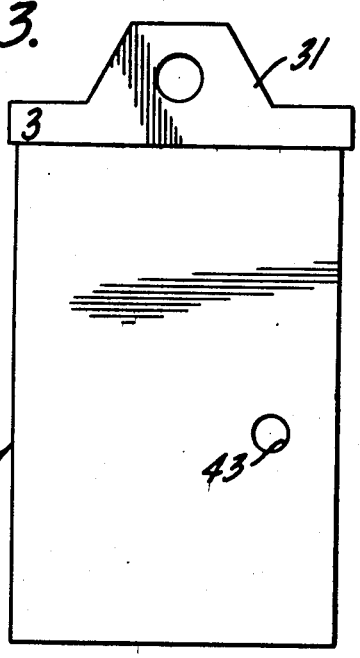

Dark slide 21 shown in FIG. 4 of the drawings has a zone exposure opening 43 located off the longitudinal axis of the rectangular sheet 29. This opening defines zone exposure 3 and hence numeral 3 is applied to the gripping tab 31 thereof.

Figure 5:
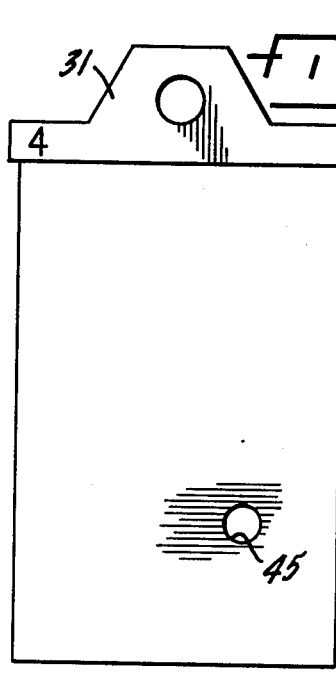

Dark slide 23 shown in FIG. 5 of the drawings has a zone exposure opening 45 formed therein which defines exposure zone 4 of the system; hence the numeral 4 is applied to the gripping tab 31 thereof.

Figure 6:
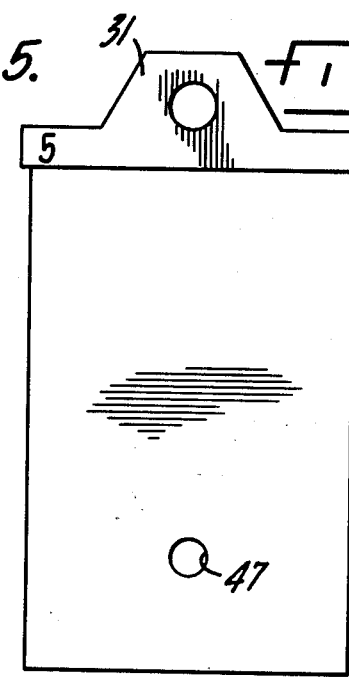

Dark slide 25 shown in FIG. 6 of the drawings has a zone exposure opening 47 formed therein which is aligned with the longitudinal axis of the sheet portion 29 of the dark slide. This opening defines exposure zone 5, hence the numeral 5 is applied to the tab 31 thereof.

Figure 7:
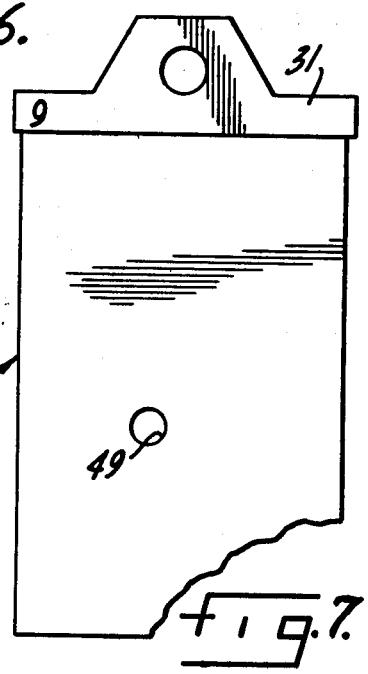

Dark slide 27 shown in FIG. 7 of the drawings has a zone exposure opening 49 formed therein. This opening creates zone exposure 9 on the negative and is located on a circle whose center is on the optical axis of the camera lens but has a smaller diameter than the circle on which the previously mentioned exposure openings were located. Numeral 9 is applied to the gripping tab 31 of this dark slide.

Dark slide 23 is shown in its reverse position in FIG. 8 of the drawings. When the dark slide is inserted in the film holder of this reversed position, its zone exposure opening 45 defines exposure zone 6. Hence, the numeral 6 is applied to the gripping tab 31 thereof.

When dark slide 21 is inserted in the film holder in its reverse position, its zone exposure opening 43 defines zone exposure 7 on the negative. Hence, its tab is marked with the numeral 7. It is shown in its reverse position in FIG. 9 of the drawings.

When dark slide 19 is inserted in the film holder and is turned over in its reverse position, its zone exposure opening 41 defines exposure zone 8. Hence, the numeral 8 is applied to its gripping tab 31. It is shown in FIG. 10.

When dark slide 27 is inserted in the film holder in the reverse position, its zone exposure opening 49 defines exposure zone 10; hence, the numeral 10 is applied to its gripping tab 31. It is shown in its reverse position in FIG. 11 of the drawings.

The set of dark slides of my invention are used with a conventional film holder having a piece of film 15 which can be developed as a negative. It can also be used with a film holder for an instant type of film in which the photograph would be made directly on the film instead of on the negative. When the film holder 11 is installed in the camera and the camera is ready for use, the dark slide 13 is removed from the film holder clearing the path between the camera lens and the film 15. The dark slide 17 is then inserted into the film holder and the first exposure is made for zone 1 which exposure will produce an exposed circle on the negative of minimum density. Dark slide 17 is removed and dark slide 19 is inserted in the film holder. Another exposure is made in accordance with the settings of the zone exposure system being used. Dark slide 19 is removed and dark slide 21 is inserted and exposure is made using the setting for zone exposure 3. The next dark slides are used in numerical order. After dark slide 25 provides exposure zone 5, dark slide 23 is turned over and inserted in the film holder to provide exposure zone 6. In a like manner, exposure zones 7 and 8 are obtained by turning over dark slides 21 and 19 respectively and taking the photographs. Exposure zones 9 and 10 are obtained by use of dark slide 27 in its obverse and reversed positions in the camera.

After the series of ten exposures have been made on the single piece of film 15, it is developed and printed to provide a photographic print 53 of the type shown in FIG. 12 of the drawings. The photographic print will contain a number of circular exposures equal to the number of zones in the zone system plus four additional exposures (not shown) located outside of the circles of the zone system if the illumination falloff determination openings 39 are used. In a ten zone exposure system, there will be eight exposures located in an outer circle and two exposures located in an inner circle with the center of the circle being aligned with the optical axis of the camera lens. Zone 1 will be shown by exposure 55 which will correspond to the portion of the negative having the minimum density. Zone 2 will be shown in exposure 57, zone 3 in exposure 59, zone 4 in exposure 61, zone 5 in exposure 63, zone 6 in exposure 65, zone 7 in exposure 67, zone 8 in exposure 69, zone 9 in exposure 71 and zone 10 in exposure 73. The exposures will be lighter as the zone number increases, thus reflecting an increase in density of the negative for each higher zone number. The shading within the circles in FIG. 12 indicates the relative darkness of the exposures of each zone. The darkness of a zone on the print 53 will be inversely proportional to the density of the negative for that zone. For aid in comparison, the zone number or the density of the negative for each exposure may be marked next to the exposure.

Having the full range of exposures in a zone exposure system on a single negative 15 simplifies the procedure of either measuring the densities with a densitometer or printing the negative on a test print 53 and visually judging the densities to personal preference or comparison to a standard multi-step gray scale.

Another advantage of having the full range of exposures on a single negative simplifies testing for density changes in the exposure when different developers, different agitation methods or different development times are used.

If a photographer has established satisfactory film speeds and development times, he can use the set of dark slides to obtain a gray scale to use as a reference when a change in equipment, or processing, or photographic materials is made.

I claim:

1. A set of dark slides for a film holder of a camera equipped with a lens in order to adapt the camera to be used with a zone system exposure procedure in which all of the exposures are made on a single piece of film, each dark slide of the set of slides having a single zone exposure operating therein, the openings being of uniform size and shape and each having a relatively small area compared to the area of the piece of film so that a sufficient number of exposures can be made on a single piece of film to create a viable zone exposure procedure system, each zone exposure opening being formed at a different location on each dark slide so that the zone exposure openings of all of the dark slides of the set of slides form a pattern of exposures on a piece of film when the piece of film is exposed separately with each dark slide in the holder, the number of dark slides and the pattern of zone exposure openings in the dark slides being selected to provide a number of separate exposures on the piece of film in the slide holder equal to the number of zones in the zone exposure procedure being used and a pattern which permits comparison of one exposure with another while separating each exposure from adjacent exposures by substantial areas of unexposed film.

2. The set of dark slides of claim 1 in which at least some of the dark slides of the set have their single zone exposure opening located on one side of the longitudinal axis of the dark slide so that the slide can be used to provide exposures at the same relative location on opposite sides of the longitudinal axis of the film by turning over the dark slide in the film holder between one exposure and another exposure.

3. The set of dark slides of claim 2 in which each zone exposure opening in a dark slide is located on a circle whose center aligns with the optical axis of the camera lens when each dark slide is positioned in the film holder for exposure of the film.

4. The set of dark slides of claim 2 in which one of the dark slides has four additional openings formed therein which additional openings are located so as to form exposures on the film which will be positioned outwardly of the pattern of zone exposures formed by the zone exposure openings in the other dark slides, the additional opening each being located approximately equidistant from the optical axis of the camera lens for use in testing wide angle lenses to determine the dropoff in illumination caused by such lenses.

* * * * *